UNITED STATES PATENT OFFICE.

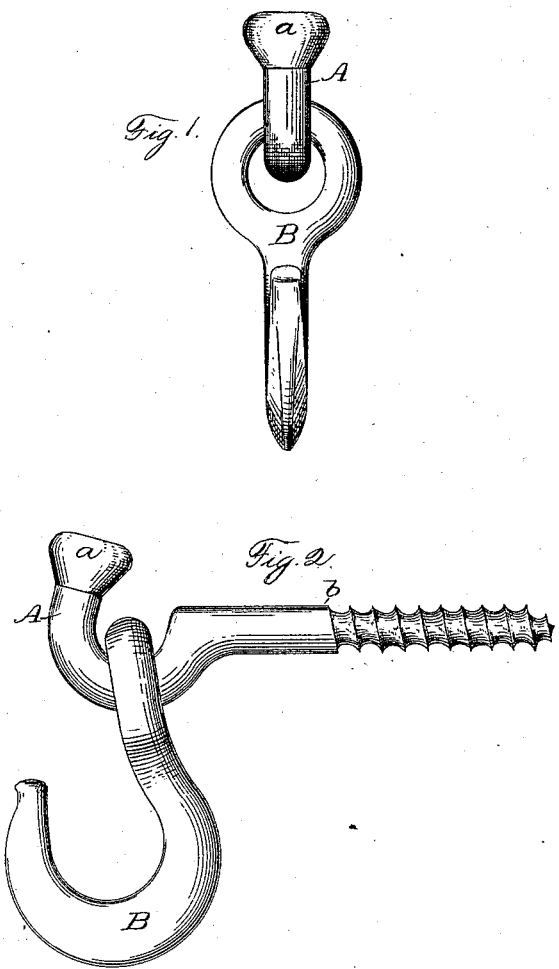

FRANK J. HERRICK AND ALONZO McMANUS, OF NEW BRITAIN, CONNECTICUT, ASSIGNORS TO THE NORTH & JUDD MANUFACTURING COMPANY, OF SAME PLACE.

SWINGING HOOK.

SPECIFICATION forming part of Letters Patent No. 311,246, dated January 27, 1885.

Application filed October 16, 1884. (No model.)

*To all whom it may concern:*

Be it known that we, FRANK J. HERRICK and ALONZO McMANUS, citizens of the United States, residing at New Britain, in the county of Hartford and State of Connecticut, have invented certain new and useful Improvements in Swinging Hooks, of which the following is a specification.

Our invention relates to improvements in the construction of swinging hooks of the class which have a stationary screw-threaded shank having a hook or eye and a movable hook connected thereto; and the object of our invention is to produce a hook which, after casting, may be readily put together without fitting. We accomplish this object by the simple construction illustrated in the accompanying drawings, in which—

Figure 1 is a front elevation of our swinging hook, and Fig. 2 is a side elevation thereof.

Our improved swinging hook is designed to be used for hanging clothes-lines, hammocks, &c.; and it consists of two parts, the stationary part A and the movable part B. The shank *b* of the stationary part A is screw-threaded. At its outer end is a hook or eye, which terminates with an enlarged head or end, *a*, which we make of such a size as will permit of a perfectly free and easy movement of the part B.

The part B consists of a hook having an eye, and is of ordinary construction, only we take care to make the eye of the hook B of a size a trifle smaller than the diameter of the enlarged end or head *a* of the part A, so that when the hook B is passed over the threaded shank *b* of the part A and the part A screwed to a suitable support, the parts will be securely fastened together. After the castings are obtained no fitting of the parts is necessary to put them together, for all that is required is to slip the eye of the part B over the shank *b* of the part A and to screw the part A to any suitable support.

We claim as our invention—

In a swinging hook, the combination of the part A, having the shank *b*, for securing the complete device in place, and upon the outer end of said shank the open hook or eye, which terminates in the enlarged end or head *a*, with the hook B, having an eye whose diameter is smaller than that of said head *a*, substantially as described, and for the purpose specified.

FRANK J. HERRICK.
ALONZO McMANUS.

Witnesses:
H. C. NOBLE,
E. M. WIGHTMAN.